# United States Patent

Izumo

(10) Patent No.: US 7,313,868 B2
(45) Date of Patent: Jan. 1, 2008

(54) CUTOFF TOOL

(75) Inventor: Norifumi Izumo, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 80 days.

(21) Appl. No.: 11/274,613

(22) Filed: Nov. 15, 2005

(65) Prior Publication Data

US 2006/0101651 A1 May 18, 2006

(30) Foreign Application Priority Data

Nov. 15, 2004 (JP) ............................. 2004-330857
Sep. 26, 2005 (JP) ............................. 2005-277168

(51) Int. Cl.
*B23D 49/16* (2006.01)
(52) U.S. Cl. .............................. 30/392; 30/92; 30/241; 30/277.4
(58) Field of Classification Search .................. 30/92, 30/166.3, 272.1, 277.4, 182, 241, 371, 392
See application file for complete search history.

(56) References Cited

U.S. PATENT DOCUMENTS

| 470,586 | A | * | 3/1892 | Morgan | 30/242 |
|---|---|---|---|---|---|
| 1,010,817 | A | * | 12/1911 | Strong | 30/241 |
| 2,195,045 | A | | 3/1940 | Bernay | |
| 2,687,572 | A | * | 8/1954 | Matthews | 30/182 |
| 3,834,019 | A | * | 9/1974 | Smeltzer et al. | 30/92 |
| 4,026,028 | A | * | 5/1977 | Green | 30/233 |
| 4,198,748 | A | * | 4/1980 | Lewis | 30/180 |
| 4,644,650 | A | | 2/1987 | Laux et al. | |
| 5,261,163 | A | * | 11/1993 | Shearhart | 30/242 |
| 5,611,146 | A | * | 3/1997 | Ducret | 30/92 |
| 6,374,498 | B1 | * | 4/2002 | Liu | 30/211 |
| 2003/0047053 | A1 | * | 3/2003 | Nakamura | 83/651 |

FOREIGN PATENT DOCUMENTS

| DE | 19713926 B4 | 2/2005 |
|---|---|---|
| JP | 7-100255 | 11/1995 |
| JP | 09-010449 | 1/1997 |
| JP | 3051738 | 6/1998 |

OTHER PUBLICATIONS

German Office Action corresponding to German Application No. 10-2005-054-655.2 dated Mar. 30, 2007.

* cited by examiner

*Primary Examiner*—Hwei-Siu C. Payer
(74) *Attorney, Agent, or Firm*—Myers, Bigel, Sibley & Sajovec, P.A.

(57) ABSTRACT

In a cutoff tool, a hood is arranged to overlap a distal end portion of a cutting blade, and a distal end portion of the hook is arranged to protrude from a toothed portion of the cutting blade. When the cutting blade retracts farthest in a uniaxial direction, the distal end portion of the cutting blade is arranged to overlap the hook in a plan view, wherein a space for holding an object to be cut is formed between the toothed portion of the cutting blade and the distal end of portion of the hook. When the cutting blade advances farthest in a uniaxial direction, the distal end portion of the cutting blade is arranged not to protrude from the hook to the outside.

17 Claims, 5 Drawing Sheets

CUTOFF TOOL

FIELD OF THE INVENTION AND RELATED ART STATEMENT

The present invention relates to a cutoff tool capable of being used to cut a cable-like member or a sheet-like member such as a carpet. More particularly, it relates to a cutoff tool suitably used when a wire harness (cable), a carpet, or the like is separated from a vehicle at the time when an end-of-life vehicle (ELV) is dismantled.

When a wire harness is removed from an ELV in an operation for dismantling an ELV for recycling, an operation in which the wire harness is cut in advance at several places, and then the cut wire harnesses are pulled out individually is most efficient to perform. Also, in an operation in which an engine is separated from a car body, a wire harness must be cut in advance. As a main cutting method that is being used at present to remove such a wire harness, cutting methods in which scissors, a cutter knife, a sickle, or the like is used as disclosed in Japanese Patent Publication No. 7-100255, Japanese Utility Model Registration No. 3051738, Japanese Patent Provisional Publication No. 9-10449, and the like are known.

Wire harnesses (cable) for production cars are as thick as about 40 mm in diameter at a maximum, so that it is difficult to cut such a thick wire harness by the above-described method. Also, in some of the above-described conventional methods, an operation in which both hands are used is required. Therefore, the worker is forced to perform the operation in a place having a limited space where the operation cannot be checked such as an engine compartment or a corner portion of passenger compartment, in an unstable state in which both hands are used. In particular, in the case where it is necessary to move a cutoff tool back and forth for cutting as in the case of a sickle, the cutoff tool such as a sickle cannot be moved freely in a limited space like the engine compartment, so that it is difficult to use the cutoff tool.

A variety of types of cable cutters for cutting a wire harness and a cable are on the market. However, most of the cable cutters are designed to be used in a state in which one end of the wire harness or cable is free. Therefore, they are unsuitable for applications in which the wire harness or cable, both sides of which are fixed as in the case of dismantling ELV's, is cut in a midway location. Also, in order to perform an operation for removing a wire harness installed on a floor in the car, it is necessary to perform in advance the operation for removing a carpet laid on the floor. As a method for removing the carpet, a method in which scissors, a cutter knife, a sickle, or the like is used for cutting as in the case of cutting a wire harness is carried out at present. With this method, however, the cutting operation is difficult to perform and much manpower is required in the case where the carpet is thick. Further, in this case, this method has a problem in that the edge of tool is liable to be damaged, and hence the running cost is high.

OBJECT AND SUMMARY OF THE INVENTION

The present invention has been made in view of the above situation, and accordingly an object thereof is to provide a cutoff tool which is capable of cutting a wire harness or a cable easily and reliably with high workability by an easy motion using only one hand without the need for force even in places where an operation using both hands cannot be performed, a good work posture cannot be assumed (namely, force cannot be applied for the operation), and work posture is unstable, such as a limited space in an engine compartment etc. or a corner portion of a floor. It is a further object of the present invention to provide a cutoff tool which is capable of cutting even a wire harness or a cable having a large diameter in a short period of time, and capable of cutting a flat member such as a carpet and a sting-shaped member such as a wire harness with one kind of tool.

To achieve the above object, the present invention provides a cutoff tool including a cutting blade having a toothed portion for cutting an object to be cut; a reciprocating drive mechanism for reciprocating the cutting blade in a uniaxial direction while a proximal end portion on one end side of the cutting blade is held; and a hook whose distal end portion is formed into a hook claw shape, wherein in a plan view in the direction perpendicular to a plane including the cutting blade and the hook, the hook is arranged so as to overlap with a distal end portion on the other end side of the cutting blade, and the hook claw shaped distal end portion of the hook is arranged so as to protrude from the toothed portion of the cutting blade; in a state in which the cutting blade retracts farthest in a uniaxial direction, the distal end portion of the cutting blade in a uniaxial direction, which is the direction in which the cutting blade reciprocates, is arranged at a position such as to overlap with the hook in the plan view, by which a space for holding an object to be cut is always formed between the edge portion of the cutting blade and the distal end portion of the hook; and in a state in which the cutting blade advances farthest in a uniaxial direction, the distal end portion of the cutting blade is arranged so as not to protrude from the hook to the outside.

Also, in the present invention, the hook claw shaped distal end portion of the hook is formed so as to have an acute angle, by which the distal end of the hook is formed so as to have a sharp-pointed shape.

Also, in the present invention, an angle formed between the uniaxial direction, which is the direction in which the cutting blade reciprocates, and the hook claw shaped distal end portion of the hook is set at 40 to 45 degrees.

Also, in the present invention, at an extreme distal end of the hook claw shaped distal end portion of the hook, a bent portion curved in the direction such as to retract from the cutting blade is provided.

Also, in the present invention, a hole is formed in the hook, and the distal end portion of the cutting blade is insertedly arranged in the hole in a state of capable of reciprocating along the uniaxial direction.

Also, in the present invention, a hook portion facing to a back face of the cutting blade on the opposite side to the toothed portion of the cutting blade is formed into a curved shape such that the portion retracts from the cutting blade.

Also, in the present invention, of the inner peripheral surfaces of the hook, an inner peripheral surface of the hook portion, which faces the back face of the cutting blade on the opposite side to the toothed portion of the cutting blade, has a cross section of a wedge shape spreading in the direction of receding from the cutting blade.

Also, in the present invention, in a portion where the distal end portion of the cutting blade overlaps with the hook, a contour line on the inside of the hook is formed so as to be inclined toward the distal end portion side of the cutting blade from the toothed portion of the cutting blade to the back face of the cutting blade, by which the contour line is arranged so as to cross the cutting blade slantwise.

Also, in the present invention, the contour line on the inside of the hook is formed into a straight line shape from the range in which the distal end portion of the cutting blade and the hook overlap with each other to the hook claw shaped distal end portion of the hook.

Also, in the present invention, a cutting blade holding portion having a plane overlapping with the proximal end portion of the cutting blade in a plan view is provided in a portion of the proximal end portion of the cutting blade.

Also, in the present invention, the cutting blade holding portion has a contour line inclined toward the distal end portion side of the cutting blade from the toothed portion of the cutting blade to the back face of the cutting blade, and the contour line is arranged so as to cross the cutting blade slantwise.

Also, in the present invention, the contour line on the inside of the hook, which crosses the distal end portion of the cutting blade, and the contour line of the cutting blade holding portion, which crosses the proximal end portion of the cutting blade, are arranged substantially in parallel with each other.

Also, in the present invention, the cutting blade holding portion is formed integrally with the hook.

Also, in the present invention, the contour line on the inside of the hook, which crosses the distal end portion of the cutting blade, and the contour line of the cutting blade holding portion, which crosses the proximal end portion of the cutting blade, are connected to each other via a curved portion at a location on the back face side of the cutting blade, and the cross section of the curved portion is formed into a wedge shape.

Also, in the present invention, a drive source for reciprocating motion of the cutting blade is air or electricity.

Also, in the present invention, the cutting blade and the hook are provided in a distal end location of a tool body that can be held by hand.

Also, in the present invention, the cutting blade is a saw-like blade.

According to the present invention, the operation and effects described below are achieved.

The present invention provides a cutoff tool including a cutting blade having a toothed portion for cutting an object to be cut; a reciprocating drive mechanism for reciprocating the cutting blade in a uniaxial direction while the proximal end portion on one end side of the cutting blade is held; and a hook the distal end portion of which is formed into a hook claw shape. In this cutoff tool, in a plan view in the direction perpendicular to a plane including the cutting blade and the hook, the hook is arranged so as to overlap with the distal end portion on the other end side of the cutting blade, and the hook claw shaped distal end portion of the hook is arranged so as to protrude from the toothed portion of the cutting blade; and in a state in which the cutting blade retracts farthest in a uniaxial direction, the distal end portion of the cutting blade in the uniaxial direction, which is the direction in which the cutting blade reciprocates, is arranged at a position such as to overlap with the hook in the plan view, by which a space for holding an object to be cut is always formed between the toothed portion of the cutting blade and the distal end portion of the hook. Therefore, an object to be cut is hooked on the hook and is guided to the space always formed between the toothed portion of the cutting blade and the distal end portion of the hook to form a held state, by which the object to be cut can be prevented from moving in the direction such as to retract from the toothed portion of the cutting blade, and hence the object to be cut can be cut with high workability (with high efficiency) by merely performing the simple operation of hooking the object to be cut on the hook and pulling it. Also, even in the state in which the cutting blade advances farthest, the distal end portion of the cutting blade is arranged so as not to protrude from the hook to the outside. Therefore, even when being used at a limited place where other parts etc. are installed in a complicated manner, the object to be cut can be cut without damaging other parts and the cutting blade (especially, the distal end portion thereof).

Also, in the present invention, the hook claw shaped distal end portion of the hook is formed so as to have an acute angle, by which the distal end of the hook is formed so as to have a sharp-pointed shape. Therefore, even an object to be cut located in a limited place where other parts are installed complicatedly or in a corner portion can be cut by being pulled out of the limited place or the corner portion by being hooked on the sharp-pointed distal end. Also, the sharp-pointed distal end of hook is plunged into a flat member such as a carpet laid on the floor etc. of a car, and the toothed portion of cutting blade is brought close to the carpet, by which the carpet can be cut appropriately.

Also, in the present invention, the angle formed between the uniaxial direction, which is the direction in which the cutting blade reciprocates, and the hook claw shaped distal end portion of the hook is set at 40 to 45 degrees. Therefore, by the formation of such an angle, an object to be cut having a circular cross section as in the case of a wire harness and a shape liable to get away from the toothed portion can be held firmly, i.e., can be held stably between the hook claw shaped distal end portion of the hook and the toothed portion of the cutting blade.

Also, in the present invention, at the extreme distal end of the hook claw shaped distal end portion of the hook, the bent portion curved in the direction such as to retract from the cutting blade is provided. Therefore, the operation and effects described below can be achieved. By forming the extreme distal end portion of hook into a shape bent so that the extreme distal end portion of hook retracts from the cutting blade, the cutting tool is directed in the direction perpendicular to a carpet surface when the hook is plunged into a carpet etc., so that the extreme distal end portion (the bent portion) of the hook is easily plunged into the carpet. Also, deteriorated workability such that the distal end portion of hook is less prone to be hooked on a felt etc. affixed on the back surface of carpet can be prevented. Further, since a distance between the distal end of hook and the cutting blade can be increased, the wire harness can be picked up easily. Also, by providing the bent shape only in the extreme distal end portion of the hook and by keeping a range of the hook in the distal end portion close to the cutting blade at an angle of about 45 degrees, the ease of plunging into the carpet can be increased without impairing the holding property of the wire harness.

Also, in the present invention, a hole is formed in the hook, and the distal end portion of the cutting blade is insertedly arranged in the hole in a state capable of reciprocating along a uniaxial direction. Therefore, the distal end portion of cutting blade can reliably be covered by the hook. For this reason, in the case where the cutting blade is a part that has low rigidity and is liable to be deflected laterally, the hole in the hook serves as a guide for the cutting blade, and hence the cutting blade can be prevented from being broken. Also, the guiding function of the hole in the hook can restrain the lateral movement of the cutting blade, so that the workability can be increased, and also the durability of the cutting blade can be enhanced.

Also, in the present invention, the hook portion facing the back face of the cutting blade on the opposite side to the toothed portion of the cutting blade is formed into a curved shape such that the portion recedes from the cutting blade.

Therefore, due to the presence of the hook portion (relief shape portion) formed into a curved shape, a cut portion of an object to be cut, which has been cut and moved rearward from the cutting blade, can be prevented from hitting the hook and from being stopped moving further rearward.

Also, in the present invention, of the inner peripheral surfaces of the hook, an inner peripheral surface of the hook portion, which faces the back face of the cutting blade on the opposite side to the toothed portion of the cutting blade, has a cross section of a wedge shape spreading in the direction of receding from the cutting blade. Therefore, the operation and effects described below can be achieved. In the case where a thick wire harness etc. is cut, a cut portion on the side which is being cut by the cutting blade is closed, and the cutting blade is held between the cut surfaces facing each other. Accordingly, the unidirectional reciprocating motion of the cutting blade runs the risk of being hindered. However, according to the cutoff tool in accordance with the present invention, the guiding function of the cross section of a wedge shape provided in the hook portion facing the back face of the cutting blade widens the cut surfaces of the cut portion of the object to be cut, so that the cutting blade can be prevented from being held. Also, in the case where a carpet is cut, the guiding function of the cross section of a wedge shape widens the cut portion of carpet, so that the cut carpet can be prevented from being caught by the cutting blade.

Also, in the present invention, in a portion where the distal end portion of the cutting blade overlaps with the hook, a contour line on the inside of the hook is formed so as to be inclined toward the distal end portion side of the cutting blade from the toothed portion of the cutting blade to the back face of the cutting blade, by which the contour line is arranged so as to cross the cutting blade slantwise. Since the contour line is arranged so as to cross the cutting blade slantwise, the area for the hook to hold the cutting blade can be increased, and the cutting blade can be prevented from being bent as compared with the case where the contour line crosses the cutting blade at right angles. Also, since the contour line is formed so as to be inclined toward the distal end portion side of the cutting blade from the toothed portion of the cutting blade to the back face of the cutting blade, the wire harness is guided in the direction such as to be directed to the teeth of the cutting blade, so that the wire harness can effectively be brought into contact with the teeth, which allows smooth cutting.

Also, in the present invention, the contour line on the inside of the hook is formed into a straight line shape from the range in which the distal end portion of the cutting blade and the hook overlap with each other to the hook claw shaped distal end portion of the hook. Therefore, the operation and effects as described below can be achieved. The wire harness is easily be oscillated back and forth by the reciprocating motion of the cutting blade. However, by providing the continuous straight line shaped portion ranging from the distal end portion of the hook to the cutting blade, the wire harness can be guided so as to be pressed against the straight line shaped portion, so that the wire harness can be guided in the direction such as to be directed to the teeth of the cutting blade even during the cutting operation, whereby the wire harness can be cut smoothly to the end.

Also, in the present invention, the cutting blade holding portion having a plane overlapping with the proximal end portion of the cutting blade in a plan view is provided in a portion of the proximal end portion of the cutting blade. Therefore, the exposure of the cutting blade can be minimized, and the holding portion of the cutting blade can be increased, so that the cutting blade can be prevented from being bent.

Also, in the present invention, the cutting blade holding portion has a contour line inclined toward the distal end portion side of the cutting blade from the toothed portion of the cutting blade to the back face of the cutting blade, and the contour line is arranged so as to cross the cutting blade slantwise. Therefore, by the contour line crossing the cutting blade slantwise, the area for the hook to hold the cutting blade can be increased as compared with the case where the contour line crosses the cutting blade at right angles, whereby the cutting blade can be prevented from being bent. Also, since the contour line is formed in the direction such as to be inclined toward the distal end portion side of the cutting blade from the toothed portion of the cutting blade to the back face of the cutting blade, the wire harness is guided in the direction such as to be directed to the teeth of the cutting blade, so that the wire harness can effectively be brought contact with the teeth, which allows smooth cutting.

Also, in the present invention, the contour line on the inside of the hook, which crosses the distal end portion of the cutting blade, and the contour line of the cutting blade holding portion, which crosses the proximal end portion of the cutting blade, are arranged substantially in parallel with each other. Therefore, the cutting blade can be guided so as to hold the wire harness from both sides by the contour lines that are substantially parallel with each other, so that the wire harness can be prevented from oscillating, which allows smooth cutting. Specifically, by providing the cutting blade holding portion having the contour line that is substantially parallel with the continuous straight line shaped portion, which is provided in the range from the distal end portion of hook to the cutting blade, in a portion of hook corresponding to the proximal end portion of cutting blade, the wire harness can be held between the both faces of the face portion (contour line) crossing the cutting blade slantwise when the wire harness is cut, so that the back-and-forth oscillations of wire harness caused by the reciprocating motion (back-and-forth movement) of cutting blade at the time of cutting can be restrained to the minimum.

Also, in the present invention, the cutting blade holding portion is formed integrally with the hook. Therefore, the number of parts and the assembling manpower can be reduced, and the rigidity of cutting blade holding portion can be improved.

Also, in the present invention, the contour line on the inside of the hook, which crosses the distal end portion of the cutting blade, and the contour line of the cutting blade holding portion, which crosses the proximal end portion of the cutting blade, are connected to each other via a curved portion at a location on the back face side of the cutting blade, and the cross section of the curved portion is formed into a wedge shape. Therefore, when a thick wire harness is cut, the portion having been cut before passes between the substantially parallel straight line shaped portions and is guided to the curved portion of hook, so that the cut end of wire harness cut into the wedge shape. Therefore, the wire harness can be cut smoothly to the end without being caught by the portion of hook located on the back face side of cutting blade.

Also, in the present invention, the drive source for reciprocating motion of the cutting blade is air or electricity. Therefore, no operation for reciprocating the cutting blade is needed. A worker can cut an object to be cut merely by performing the operation of hooking the object to be cut on a hook and pulling, then turning on a drive switch for reciprocating motion.

Also, in the present invention, the cutting blade and the hook are provided at the distal end location of a tool body that can be held by hand. Therefore, a worker can easily perform a hooking operation of the hook on the object to be cut by gripping the tool body with one hand.

Also, in the present invention, the cutting blade is a saw-like blade. Therefore, the use of the saw-like blade can increase cutting ability, and the cutting operation can be performed more smoothly and rapidly than when a cutter or the like blade that is not a saw-like blade is used. Also, a broken blade can be replaced easily at a low cost.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
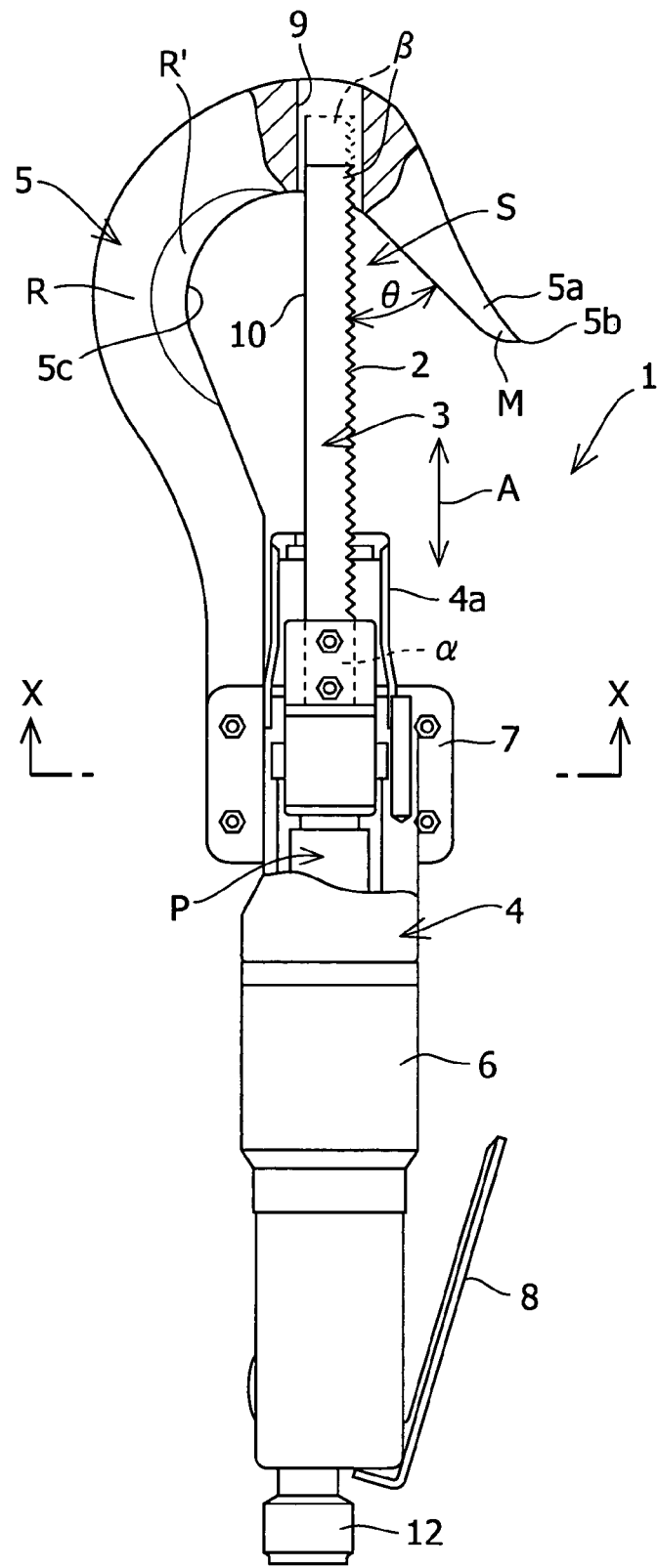
FIG. 1 is a plan view showing a basic configuration of a cutoff tool in accordance with a first embodiment of the present invention.

FIG. 1 shows a basic construction of a cutoff tool 1 in accordance with a first embodiment of the present invention. As shown in FIG. 1, the cutoff tool 1 includes a cutting blade 3 having a toothed portion 2 for cutting an object to be cut (for example, a wire harness or a cable for car or a carpet laid on a floor in a passenger compartment), a tool body 4 containing a reciprocating drive mechanism P for reciprocating the cutting blade 3 in a uniaxial direction (in the direction indicated by the arrow A in FIG. 1) with a proximal end portion a being held on one end side of the cutting blade 3, and a hook 5 in which a distal end portion 5a thereof is formed into a hook claw shape. Although the cutting blade 3 used in this embodiment has a saw-like blade, any other types of cutting blades that can cut an object to be cut by reciprocating motion can be used.

Figure 2:
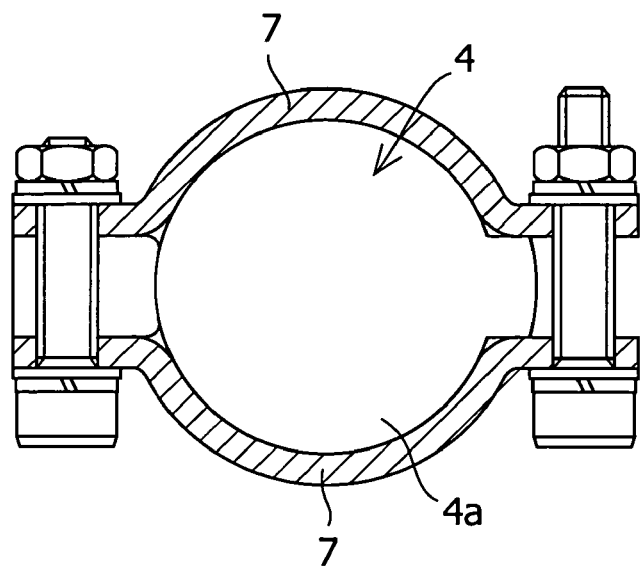
FIG. 2 is an enlarged sectional view taken along the line X-X of FIG. 1.

As shown in FIGS. 1 and 2, the above-described tool body 4 has, for example, a substantially cylindrical gripper 6 capable of being held by hand. A pair of hook mounting brackets 7, which are installed in a distal end portion 4a at a location adjacent to the gripper 6, is tightened with bolts, by which the hook 5 is attached to the distal end portion 4a of the tool body 4. The gripper 6 preferably has a shape and size such that the worker can hold the cutoff tool 1 with one hand. In the distal end portion 4a of the tool body 4 on the opposite side to the gripper 6, the proximal end portion α of the cutting blade 3 is connected to the reciprocating drive mechanism P (refer to FIG. 1), and the cutting blade 3 is arranged so as to protrude to the outside of the tool body 4 through the distal end portion 4a of the tool body 4. Thus, the reciprocating drive mechanism P is operated by the turning operation of a control lever 8 disposed at one end of the gripper 6, and accordingly the cutting blade 3 is reciprocated in a uniaxial direction (in the direction indicated by the arrow A in FIG. 1).

On the other hand, the hook 5 fixed to the tool body 4 has the distal end portion 5a formed into a hook claw shape as described above, and in a location near the distal end portion 5a (location corresponding to the cutting blade 3), a hole (through hole) 9 having a rectangular cross section is formed so as to extend along the direction in which the cutting blade 3 is reciprocated. A distal end portion β of the cutting blade 3 protruding from the tool body 4, which is a distal end portion on the opposite side to the proximal end portion α, is arranged so as to be inserted in the hole 9 in the hook 5 in a state in which the cutting blade 3 can be reciprocated. The width of the hole 9 is set slightly greater than the thickness of the cutting blade 3, and thus the distal end portion β of the cutting blade 3 is insertedly arranged in the hole 9 in a state of being guided to prevent lateral oscillations (in a sliding contact state with a slight backlash). Thus, in the plan view in the direction perpendicular to a plane including the cutting blade 3 and the hook 5, the hook 5 and the cutting blade 3 are arranged so as to overlap with each other. Also, the hook claw shaped distal end portion 5a of the hook 5 is arranged so as to protrude from the toothed portion 2 of the cutting blade 3. In a state in which the cutting blade 3 advances farthest in a uniaxial direction (in a state in which the cutting blade 3 is located at a position indicated by the chain line in FIG. 1), the distal end portion β of the cutting blade 3 is arranged so as not to protrude from the hook 5 to the outside.

Also, in a state in which the cutting blade 3 retracts farthest in a uniaxial direction (in a state in which the cutting blade 3 is located at a position indicated by the solid line in FIG. 1), the distal end portion β of the cutting blade 3 is arranged at a position such as to overlap with the hook 5 in the aforementioned plan view. Thereby, a space S for holding an object to be cut between the toothed portion 2 of the cutting blade 3 and the distal end portion 5a of the hook 5 (a holding space held between the toothed portion 2 of the cutting blade 3 and the distal end portion 5a of the hook 5) S is always formed even in the state in which the cutting blade 3 retracts farthest. More specifically, the toothed portion 2 of the cutting blade 3 and the distal end portion 5a of the hook 5 are arranged in a state of facing to each other with an angle θ (refer to FIGS. 1 and 4) of about 45 degrees, and the space S for holding an object to be cut therebetween is always formed. That is to say, the configuration is such that the distal end portion β of the cutting blade 3 does not come off the hole 9 in the state in which the cutting blade 3 retracts farthest in a uniaxial direction. Also, the angle θ formed between the uniaxial direction (the direction indicated by the arrow A), which is the direction in which the cutting blade 3 reciprocates, and the hook claw shaped distal end portion 5a of the hook 5 is set at about 45 degrees. Also, at the extreme distal end of the hook claw shaped distal end portion 5a of the hook 5, a bent portion M curved in the direction such as to get away from the cutting blade 3 is provided (refer to FIG. 1). Further, the hook claw shaped distal end portion 5a is formed so as to have an acute angle, by which an extreme distal end 5b of the hook 5 is formed so as to have a sharp-pointed shape.

Figure 3:
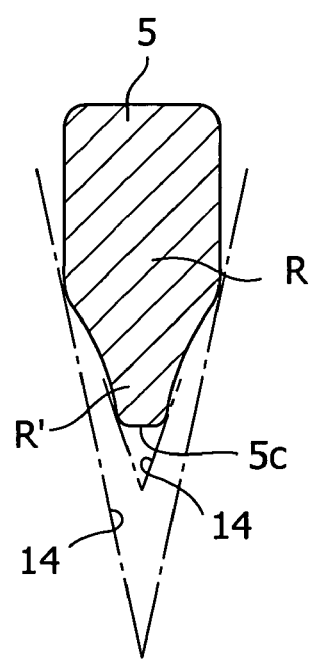
FIG. 3 is an enlarged sectional view of a hook portion facing the back face of a cutting edge.

As shown in FIGS. 1 and 3, a predetermined portion of the hook 5, namely, a hook portion R facing a back face 10 of the cutting blade 3 on the opposite side to the toothed portion 2 of the cutting blade 3 is formed into a curved shape such that the portion recedes from the cutting blade 3. That is to say, the curved shape is made a relief shape such that when an object to be cut is cut by the cutting blade 3, a portion of the object to be cut, which has been cut and moved rearward from the cutting blade 3, can be prevented from hitting the hook portion R and from being stopped moving further rearward. As clearly shown in FIG. 3, of the inner peripheral surfaces of the hook 5, an inner peripheral surface 5c of the hook portion R, which faces the back face 10 of the cutting blade 3, has a cross section of a wedge shape spreading in the direction of getting away from the cutting blade 3. That is to say, a wedge portion R' having a wedge-shaped cross section is formed on the side of the inner peripheral surface 5c of the hook portion R.

A drive source for the reciprocating drive mechanism P for reciprocating the cutting blade 3 is not subject to any special restriction, and air, electricity, and the like can be used. For the cutoff tool 1 of this embodiment, the drive source is air supplied from the outside of the tool body 4. An air drive source may be incorporated in the tool body 4. In this embodiment, the cutoff tool 1 shown in FIG. 1 uses air as the drive source, and an attachment 12 capable of connecting with an air hose is provided at the rear end of the tool body 4 (one end of the gripper 6). The attachment 12 may have the same construction as that of a commercially available tool that uses air as the drive source. The cutoff tool 1 in which a commercially available air-driven or electrically powered saw (reciprocal saw) is used as the base has advantages of increased reliability, easy operation, unneeded force, low running cost (saw blade has only to be replaced), and the like.

Figure 4:
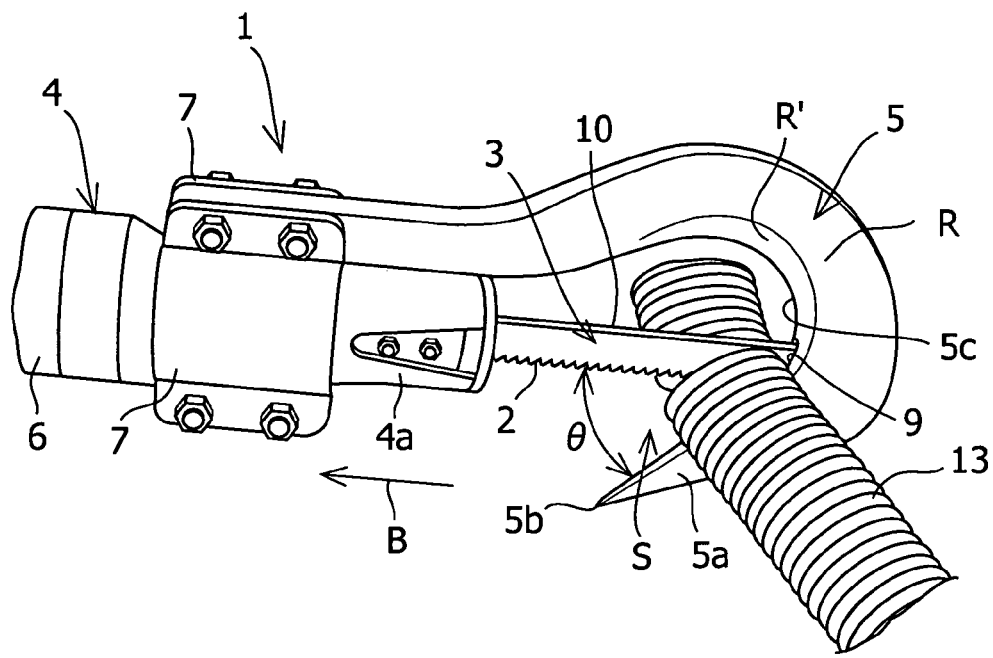
FIG. 4 is a perspective view showing a state in which a wire harness is cut by using the cutoff tool shown in FIG. 1.

An operation for cutting an automotive wire harness 13 by using the cutoff tool 1 configured as described above is hereunder explained. First, as shown in FIG. 4, the gripper 6 of the cutoff tool 1 is held with one hand, the distal end portion 5a of the hook 5 is hooked on the wire harness 13, which is an object to be cut, and the wire harness 13 entering into the corner of floor is pulled out. Then, the wire harness 13 is pulled into the space S (holding space), and the wire harness 13 is held between the toothed portion 2 of the cutting blade 3 and the distal end portion 5a of the hook 5. Thereafter, in this state, the control lever 8 is gripped, by which the reciprocating drive mechanism P is operated, by which the cutting blade 3 is reciprocated (driven) in a uniaxial direction. In this state, the cutoff tool 1 is moved so as to be pulled in the direction indicated by the arrow B in FIG. 4, by which the wire harness 13 is brought into contact with the edge portion 2 of the cutting blade 3 in the state in which the wire harness 13 is held in the space S to cut the wire harness 13.

Thus, according to the cutoff tool 1 of this embodiment, the wire harness 13 can be cut easily with high workability by a simple operation of hooking the distal end portion 5a of the hook 5 on the wire harness 13 and pulling the cutoff tool 1 (actually, the cutting operation is performed simultaneously with the hooking operation). At this time, the wire harness 13, which is an object to be cut, is cut while a pulling force is applied by the hook 5, so that problems such as the cut portion of the wire harness 13 being forced open can be prevented. The cutting blade 3 is held by the cut cross section to stop the reciprocating motion. Further, since the angle θ formed between the edge portion 2 of the cutting blade 3 and the distal end portion 5a of the hook 5, which always forms the space S for holding the wire harness 13, is set at about 45 degrees, the holding of the wire harness 13 at the wire harness cutting time (the time when the cutting blade 3 is operated) is easy, and the holding of the wire harness 13 can be performed reliably. If the angle θ is set at an angle far greater than 45 degrees, it is difficult to hold the wire harness 13 during a cutting operation. Also, according to the cutoff tool 1 of this embodiment, there is no need for holding the wire harness 13 by pressing it by hand, so that an easy cutting operation can be performed with only one hand.

Also, since the distal end portion β of the cutting blade 3 is arranged in the hole 9 so as to overlap with the hook 5 in the plan view even in the state in which the distal end portion β of the cutting blade 3 retracts farthest to always secure the space S serving as a space for holding an object to be cut, the space S for holding an object to be cut can always be formed between the toothed portion 2 of the cutting blade 3 and the distal end portion 5a of the hook 5. Also, since the cutting blade 3 is arranged so as not to protrude to the outside of the hook 5 even in the state of advancing farthest, the distal end portion β of the cutting blade 3 is completely covered by the hook 5, and is supported in the hole 9 in the hook 5. Therefore, in a cutting operation in a limited space, damage to other parts or the breakage of the cutting blade 3 can be prevented, and thereby the cutting operation can be performed smoothly without trouble.

Further, according to the cutoff tool 1 of this embodiment, since the hook shape in the portion facing to the back face 10 of the cutting blade 3 is made a curved shape (relief shape) receding from the cutting blade 3, the cut portion of the wire harness 13, which has been cut and moved rearward from the cutting blade 3, can be prevented from hitting the hook 5 and from being stopped moving further rearward. Also, since the cross section of the inner peripheral surface 5c of the hook portion R facing the back face 10 of the cutting blade 3 is formed into a wedge shape, even if the wire harness 13 arrives at the inner peripheral surface 5c of the hook 5 when a thick wire harness having a diameter of, for example, about 40 mm is cut, a cut surface 14 of the wire harness 13 being cut is forced open by the wedge shaped hook portion, so that the wire harness 13 can be prevented from interfering (colliding) with the cutting blade 13.

Figure 5:
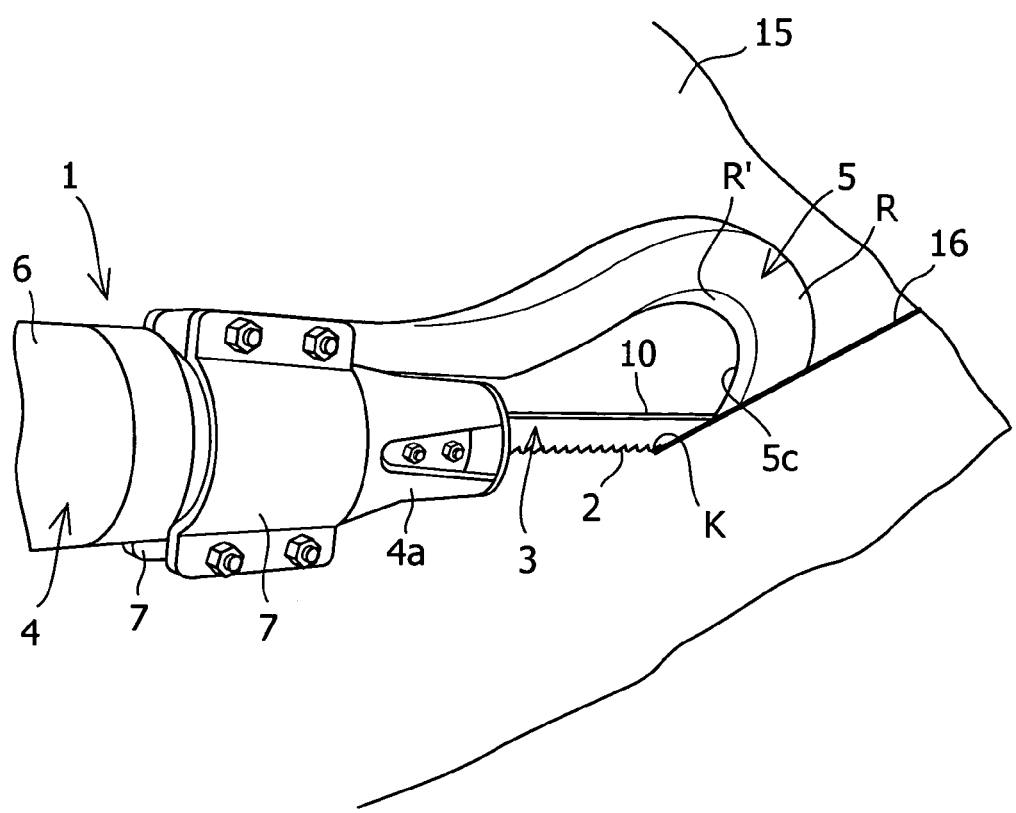
FIG. 5 is a perspective view showing a state in which a carpet is cut by using the cutoff tool shown in FIG. 1.

Also, in the case where an automotive carpet 15 is cut by using the cutoff tool 1 of this embodiment, as shown in FIG. 5, the extreme distal end portion 5b of the hook 5 is plunged into the carpet 15 from the top surface thereof, and the distal end portion 5a is arranged on the back surface side of the carpet 15, by which the carpet 15 is ripped off the floor (not shown). In this case, since the extreme distal end portion 5b of the hook 5 is made into a bent portion M curved in the direction such as to recede from the cutting blade 3 as described above, when the cutoff tool 1 is held in parallel with the surface of the carpet 15, the extreme distal end portion 5b is directed in the direction perpendicular to the surface of the carpet 15, so that the operation for plunging the extreme distal end portion 5b of the hook 5 into the carpet can be performed easily. When a state in which the carpet 15 is put into the space S and is held between the toothed portion 2 of the cutting blade 3 and the distal end portion 5a of the hook 5 is formed, the control lever 8 is operated to reciprocate the cutting blade 3. Thereafter, the cutoff tool 1 is moved so as to be pulled with one hand, by which the carpet 15 is cut as shown in FIG. 5 (in FIG. 5, K denotes a cut location).

Thus, the cutoff tool 1 of this embodiment can be used for cutting not only the wire harness 13 but also the carpet 15. According to the cutoff tool 1 of this embodiment, the distal end portion 5a of the hook 5 is plunged into the carpet 15 and the carpet 15 is ripped off the floor, and at the same time, a cutting operation can be performed.

Therefore, a series of operations such that after the carpet 15 is cut, the wire harness on the floor is cut can be performed with one kind of tool without changing the tool. In the case of a carpet cutting operation, as well as in the case of a wire harness cutting operation, the distal end portion β of the cutting blade 3 is not caught by other parts, so that the carpet 15 can be cut with high workability. Even in the case where the carpet 15 is cut, the hook portion having a wedge-shaped cross section performs a function of forcing open a cut portion 16, so that an effect of preventing the carpet 15 from being caught by the cutting blade 3 can be achieved.

Figure 6:
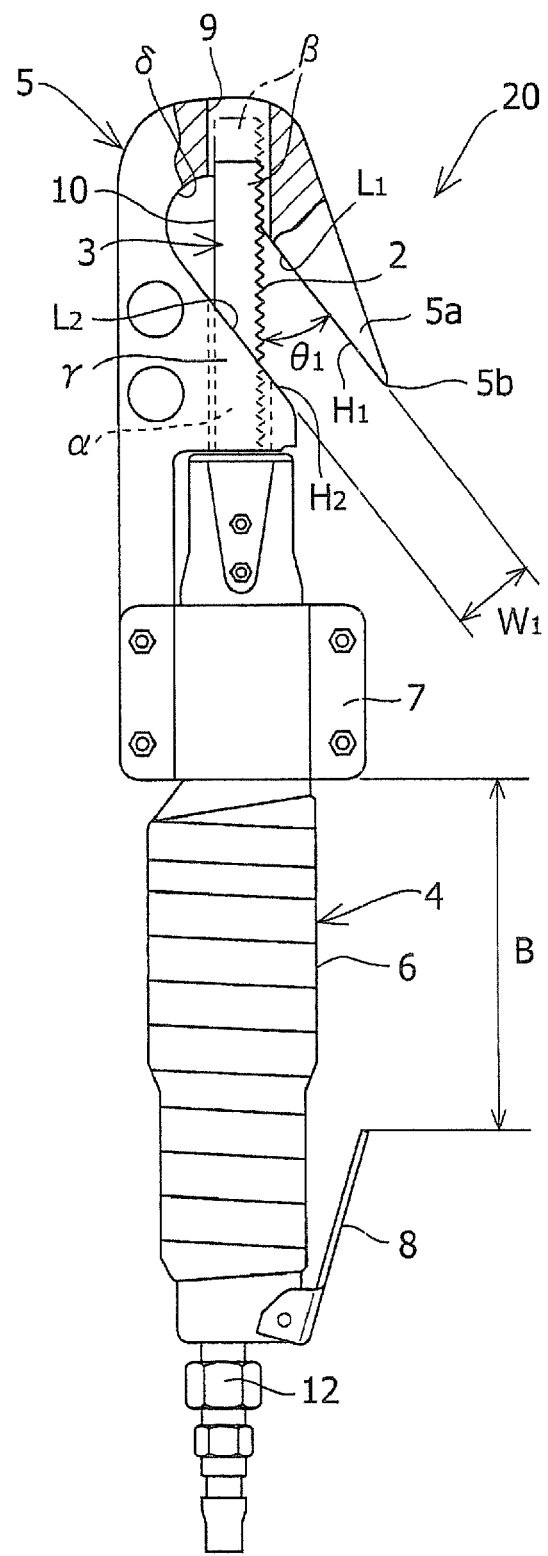
FIG. 6 is a plan view showing a basic configuration of a cutoff tool in accordance with a second embodiment of the present invention.
Figure 7:
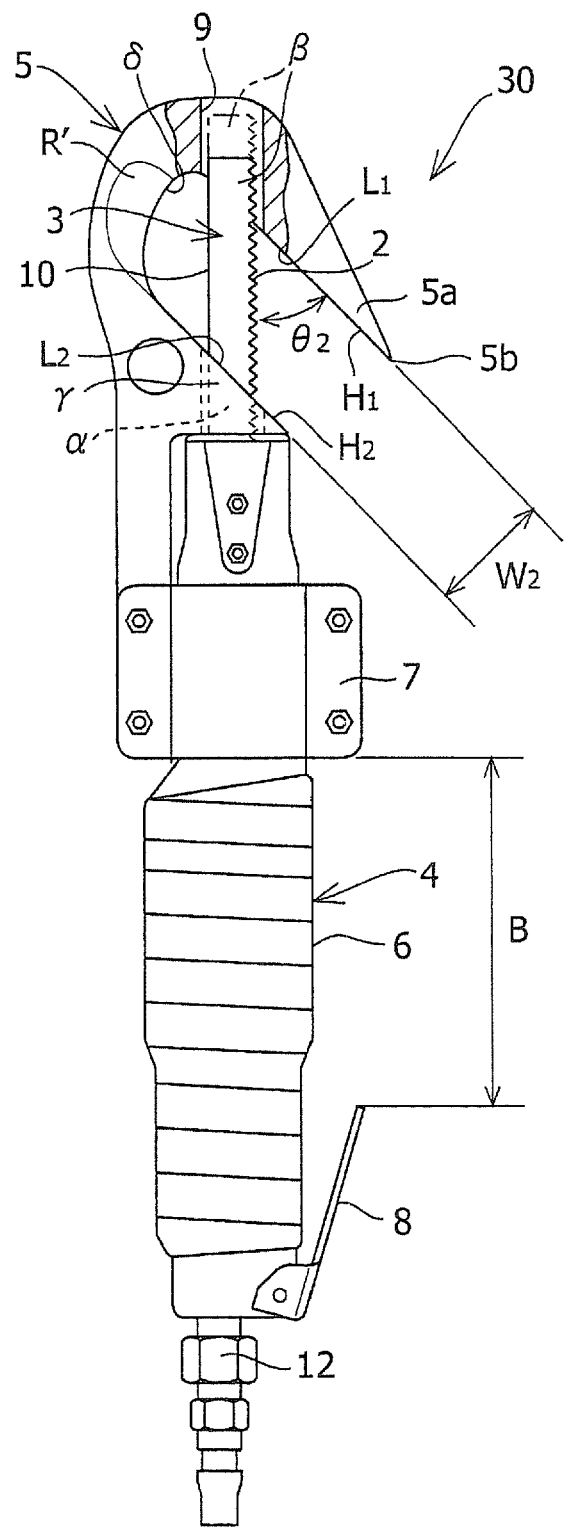
FIG. 7 is a plan view showing a basic configuration of a cutoff tool in accordance with a third embodiment of the present invention.

FIG. 6 shows a basic construction of a cutoff tool 20 in accordance with a second embodiment of the present invention. This cutoff tool 20 is used in the final process of dismantling ELV's (used for recovering thin wire harnesses remaining after most wire harnesses have been removed with a nibbler etc.). Also, FIG. 7 shows a basic construction of a cutoff tool 30 in accordance with a third embodiment of the present invention. This cutoff tool 30 is used for prior dismantling of ELV's. In FIGS. 6 and 7, the same reference characters are applied to elements that are the same as those shown in FIGS. 1 to 5, and the explanation thereof is omitted.

First, for the cutoff tools 20 and 30, a portion in which the distal end portion β of the cutting blade 3 and the hook 5 overlap with each other is formed so that a contour line $L_1$ on the inside of the hook 5 is inclined toward the distal end portion β side of the cutting blade 3 from the toothed portion 2 of the cutting blade 3 to the back face 10 of the cutting blade 10, and thereby the above-described contour line $L_1$ is arranged so as to cross the cutting blade 3 slantwise. The contour line $L_1$ on the inside of the hook 5 is formed into a straight line shape from the range in which the distal end portion β of the cutting blade 3 and the hook 5 overlap with each other to the hook claw shaped distal end portion 5a of the hook 5, and this portion is provided as a straight line shaped portion (a face portion extending in a straight line shape) $H_1$. Therefore, the straight line portion of the hook 5 for catching a wire harness has a shape extending to a location at which the portion crosses the cutting blade 3, by which a harness wire can be cut smoothly to the end.

Also, in a portion of hook corresponding to the proximal end portion α of the cutting blade 3, there is provided a substantially triangular cutting blade holding portion γ having a plane overlapping with the proximal end portion α of the cutting blade 3 in a plan view. Although the above-described substantially triangular cutting blade holding portion γ is formed integrally with the hook 5 in this example, the cutting blade holding portion γ may be provided separately. The reason for providing such a cutting blade holding portion γ (triangular portion) is as described below. If the cutoff tool is used unreasonably (for example, in an inclined state or in a prying state) during the cutting work, the cutting blade 3 is easily bent, so that the substantially triangular cutting blade holding portion γ is provided to minimize the exposure of the cutting blade 3 and to increase the holding portion of the cutting blade 3, thereby preventing the cutting blade 3 from being bent.

The above-described cutting blade holding portion γ has a contour line $L_2$ (a straight line shaped portion $H_2$ that is a face portion extending in a straight line shape) inclining toward the distal end portion side of cutting blade from the toothed portion 2 of the cutting blade 3 to the back face 10 of the cutting blade 3, and this contour line $L_2$ is arranged so as to cross the cutting blade 3 slantwise. The contour line $L_1$ (the straight line shaped portion $H_1$) on the inside of the hook 5, which crosses the distal end portion β of the cutting blade 3, and the contour line $L_2$ (the straight line shaped portion $H_2$) of the cutting blade holding portion γ, which crosses the proximal end portion α of the cutting blade 3, are arranged so as to be substantially in parallel with each other.

Also, the contour line $L_1$ on the inside of the hook 5, which crosses the distal end portion β of the cutting blade 3, and the contour line $L_2$ of the cutting blade holding portion γ, which crosses the proximal end portion α of the cutting blade 3, are connected to each other via a curved portion δ at a location on the back face 10 side of the cutting blade 3. Thus, a substantially U-shaped wire harness inserting groove is formed as a whole by the curved portion δ and the already-described straight line shaped portions $H_1$ and $H_2$, by which the cutting blade 3 is prevented from being bent and the wire harness is prevented from being moved at the time of wire harness cutting operation. That is to say, at the time of wire harness cutting operation, the wire harness is easily oscillated back and forth by the reciprocating motion of the cutting blade 3 when the cutting operation is performed in such a manner that the wire harness is pressed against the straight line shaped portion $H_1$. However, by providing the cutting blade holding portion γ as described above, the back-and-forth motion of wire harness is restrained by the straight line shaped portion $H_1$ and the straight line shaped portion $H_2$ of the cutting blade holding portion γ. In this case, since the above-described straight line shaped portion $H_1$ is the contour line $L_1$ of a straight line, and the straight line shaped portion $H_1$ is set so as to cross the cutting blade 3 slantwise, the wire harness can be cut smoothly to the end.

Further, for the cutoff tool 30 shown in FIG. 7, which is designed on the assumption that it is used to cut a wire harness having a diameter of, for example, about 30 mm, the curved portion δ has a wedge shape in cross section, and a cross-sectional wedge-shaped portion R' is provided in this portion. By providing such a cross-sectional wedge-shaped portion R', even a thick wire harness can be cut to the end without the cut end thereof intruding into the cross-sectional wedge-shaped portion R' and being caught. On the other hand, for the cutoff tool 20 shown in FIG. 6, which is designed on the assumption that it is used to cut a wire harness having a diameter of, for example, about 20 mm (not supposed to be used to cut a wire harness having a diameter not larger than about 20 mm), the curved portion δ does not have a wedge shape in cross section.

For the cutoff tools 20 and 30 of these embodiments, the cutoff tool is adapted to dismantling work while both of smoothness and ease of work are achieved without a special misoperation preventive device, and on the other hand, the control lever 8 of the gripper 6 has a necessary minimum size to secure a space for gripping the gripper 6 with a hand. As one example, the length B between the hook mounting bracket 7 and the control lever 6 (refer to FIGS. 6 and 7) is set at about 90 to 100 mm. If the length B is shorter than that value, the hand touches the control lever 6 when the cutoff tool 20, 30 is held by hand, so that an unintended operation may occur. The tool of this kind requires a misoperation preventive device, but double action is required for operation. In the case where the cutoff tool 20, 30 is used frequently, the worker at the dismantling site often uses the cutoff tool with the misoperation preventive device being off because of troublesomeness. Also, when the misoperation preventive device is turned off, both hands are required. For the work at a limited place or in a posture in which only one hand can be used, the work is done by turning off the misoperation preventive device in advance before the work, so that the work must be done under an unfavorable condition. The control lever 6 having the necessary minimum size and the provision of the space that allows the gripper 6 to be gripped by a hand achieve a simple construction, light weight, and a low cost.

Also, since the cutoff tool 20, 30 has a limited usage objective as described above, the clearance between the straight line shaped portions $H_1$ and $H_2$ (the width of the substantially U-shaped wire harness inserting groove) is set according to the usage objective thereof. As one example, the clearance $W_1$ (refer to FIG. 6) of the cutoff tool 20 that is used in the final process of dismantling ELV's is set at about 20 mm assuming a thin wire harness, and the clearance $W_2$ (refer to FIG. 7) of the cutoff tool 30 that is used for prior dismantling of ELV's is set at about 30 mm so that a thick wire harness can be inserted (brought into the groove).

Further, regarding the angle between the toothed portion 2 of the cutting blade 3 and the straight line shaped portion $H_1$ (the contour line $L_1$) of the hook 5, since the cutoff tool 20, 30 has a limited usage objective as described above, the angle $\theta_1$ (refer to FIG. 6) of the cutoff tool 20 and the angle $\theta_2$ (refer to FIG. 7) of the cutoff tool 30 are set according to the usage objective thereof. As one example, the angle $\theta_1$ (refer to FIG. 6) of the cutoff tool 20 that is used in the final process of dismantling ELV's is set at about 40 degrees so that a thin wire harness can be restrained satisfactorily, and the angle $\theta_2$ (refer to FIG. 7) of the cutoff tool 30 that is used for prior dismantling of ELV's is set at about 45 degrees so that a thick wire harness can be cut properly.

According to the cutoff tools 20 and 30 having the above-described configuration, even in places where an operation using both hands cannot be performed, a good work posture cannot be assumed (namely, force cannot be applied for the operation), and the work posture is unstable, such as a limited space in an engine compartment etc. or a corner portion of a floor, the cutting work for wire harnesses and cables can be performed easily and reliably by an easy operation that requires no force and can be performed with one hand. Even in the case where the diameter of wire harness or cable is large, a cutoff tool capable of cutting the wire harness or cable in a short period time can be provided, and further a flat object such as a carpet and a string-like member such as a wire harness can be cut by a tool of one kind.

The above is a description of one embodiment of the present invention. The present invention is not limited to the above-described embodiment, and various modifications and changes can be made based on the technical concept of the present invention. For example, in the above-described embodiments, the distal end portion β of the cutting blade 3 is arranged so as to be contained in the hole 9 formed in the hook 5. However, the configuration may be such that cutting blades 3 are arranged in parallel on the side surface sides of the hook 5, and the cutting blades 3 and hook 5 are arranged so as to overlap with each other in the plan view. Also, in the above description, explanation has been given by taking an example in which the object to be cut is a wire harness or a cable used mainly for electrical equipment of car or a carpet laid on the floor of car. However, by exchanging the cutting blade 3 for a saw blade suitable for cutting of an object to be cut, pipe materials (resin, metal such as steel and aluminum), hoses, trims, and the like can be cut. In particular, due to a characteristic of the wedge shape in cross section (the inner peripheral surface 5c of the hook 5), a thick hose etc. such as a water hose can be cut. Also, for the cutoff tools 20 and 30 in accordance with the above-described second and third embodiments, as in the case of the cutoff tool 1 in accordance with the already-described first embodiment, the bent portion curved in the direction such as to recede from the cutting blade 3 may be provided at the extreme distal end 5b of the distal end portion 5a of the hook 5. Further, for the cutoff tools 1 and 30 in accordance with the above-described first and third embodiments, the angles θ and $\theta_2$ are set at about 45 degrees, and for the cutoff tools 20 in accordance with the above-described second embodiment, the angle $\theta_1$ is set at about 40 degrees. However, these angles can be set appropriately in the range of 40 to 45 degrees. Also, for the cutoff tools 20 and 30 in accordance with the above-described second and third embodiments, the cutting blade holding portion (triangular portion) γ is formed integrally with the hook 5. However, the cutting blade holding portion γ can be configured as a separate member.

The invention claimed is:

1. A cutoff tool comprising a cutting blade having a toothed portion for cutting an object; a reciprocating drive mechanism for reciprocating the cutting blade in a uniaxial direction while a proximal end portion on one end of the cutting blade is held; and a hook whose distal end portion is formed into a hook claw shape, wherein
   in a plan view in the direction perpendicular to a plane including the cutting blade and the hook, the hook is arranged so as to overlap with a distal end portion on the other end of the cutting blade, and the hook claw shaped distal end portion of the hook is arranged so as to protrude from the toothed portion of the cutting blade,
   in a state in which the cutting blade retracts farthest in a uniaxial direction, the distal end portion of the cutting blade in the uniaxial direction, which is a direction in which the cutting blade reciprocates, is arranged at a position so as to overlap with the hook in the plan view, by which an angle formed by the toothed portion of the cutting blade and the distal end portion of the hook is an acute angle so that a space for holding or pulling out an object to be cut is always formed between the toothed portion of the cutting blade and the distal end portion of the hook, and
   in a state in which the cutting blade advances farthest in a uniaxial direction, the distal end portion of the cutting blade is arranged so as not to protrude from the hook to the outside.

2. The cutoff tool according to claim 1, wherein the hook claw shaped distal end portion of the hook is formed so as to have a sharp-pointed shape.

3. The cutoff tool according to claim 1, wherein an angle formed between a uniaxial direction, which is a direction in which the cutting blade reciprocates, and the hook claw shaped distal end portion of the hook is set at 40 to 45 degrees.

4. The cutoff tool according to claim 1, wherein at an extreme distal end of the hook claw shaped distal end portion of the hook, a bent portion curved in the direction such as to recede from the cutting blade is provided.

5. The cutoff tool according to claim 1, wherein a hole is formed in the hook, and the distal end portion of the cutting blade is insertedly arranged in the hole in a state of capable of reciprocating along a uniaxial direction.

6. The cutoff tool according to claim 1, wherein a hook portion facing a back face of the cutting blade on the opposite side to the toothed portion of the cutting blade is formed into a curved shape such that the hook portion recedes from the cutting blade.

7. The cutoff tool according to claim 6, wherein, of the inner peripheral surfaces of the hook, an inner peripheral surface of the hook portion, which faces the back face of the cutting blade on the opposite side to the toothed portion of the cutting blade, has a cross section of a wedge shape spreading in the direction of receding from the cutting blade.

8. The cutoff tool according to claim 1, wherein in a portion where the distal end portion of the cutting blade overlaps with the hook, a contour line on the inside of the hook is formed so as to be inclined toward the distal end portion side of the cutting blade from the toothed portion of the cutting blade to a back face of the cutting blade, by which the contour line is arranged so as to cross the cutting blade slantwise.

9. The cutoff tool according to claim 8, wherein the contour line on the inside of the hook is formed into a straight line shape from the range in which the distal end portion of the cutting blade and the hook overlap with each other to the hook claw shaped distal end portion of the hook.

10. The cutoff tool according to claim 1, wherein a cutting blade holding portion having a plane overlapping with the proximal end portion of the cutting blade in a plan view is provided in a portion of the proximal end portion of the cutting blade.

11. The cutoff tool according to claim 10, wherein the cutting blade holding portion has a contour line inclined toward the distal end portion of the cutting blade from the toothed portion of the cutting blade to a back face of the cutting blade, and the contour line is arranged so as to cross the cutting blade slantwise.

12. The cutoff tool according to claim 11, wherein a contour line on the inside of the hook, which crosses the distal end portion of the cutting blade, and the contour line of the cutting blade holding portion, which crosses the proximal end portion of the cutting blade, are arranged substantially in parallel with each other.

13. The cutoff tool according to claim 12, wherein the cutting blade holding portion is formed integrally with the hook.

14. The cutoff tool according to claim 13, wherein the contour line on the inside of the hook, which crosses the distal end portion of the cutting blade, and the contour line of the cutting blade holding portion, which crosses the proximal end portion of the cutting blade, are connected to each other via a curved portion at a location on the back face of the cutting blade, and the cross section of the curved portion is formed into a wedge shape.

15. The cutoff tool according to claim 1, wherein a drive source for reciprocating motion of the cutting blade is air or electricity.

16. The cutoff tool according to claim 1, wherein the cutting blade and the hook are provided in a distal end location of a tool body that can be held by hand.

17. The cutoff tool according to claim 1, wherein the cutting blade is a saw-like blade.

* * * * *